United States Patent [19]
Patel et al.

[11] Patent Number: 5,079,740
[45] Date of Patent: Jan. 7, 1992

[54] SYSTEM AND METHOD OF PROVIDING AN AUTOMATIC BACK-UP PRIMARY TERMINAL FOR A CLUSTER OF SECONDARY TERMINALS

[75] Inventors: Ramesh U. Patel; Rex D. Watkins, both of Cambridge, Ohio; Susan P. Fonner, Warrington, Pa.; Gregory L. Myers, Cambridge, Ohio

[73] Assignee: NCR Corporation, Dayton, Ohio

[21] Appl. No.: 411,236

[22] Filed: Sep. 21, 1989

Related U.S. Application Data

[63] Continuation of Ser. No. 2,544, Jan. 12, 1987, abandoned.

[51] Int. Cl.5 .................... G06F 11/00; G06F 11/16; G06F 11/20; G06F 11/30
[52] U.S. Cl. .................................. 364/900; 364/918; 364/918.1; 364/918.4; 364/918.5; 364/918.51; 364/919; 364/920; 364/923.5; 364/923.6; 364/926.9; 364/926.91; 364/927.92; 364/927.96; 364/927.97; 364/931; 364/931.4; 364/931.45; 364/935; 364/935.2; 364/935.5; 364/940; 364/940.1; 364/940.61; 364/942; 364/942.03; 364/942.4; 364/944.2; 364/943.91
[58] Field of Search ............... 364/200, 900; 371/7, 8.1, 8.2, 9.1, 11.1, 11.2, 11.3, 22.1, 22.2, 22.3, 22.4, 22.5, 22.6; 370/18, 825.05, 825.06, 825.16

[56] References Cited

U.S. PATENT DOCUMENTS

| | | | |
|---|---|---|---|
| 3,054,560 | 9/1962 | Hartley | 235/151 |
| 3,303,474 | 2/1967 | Moore et al. | 340/172.5 |
| 3,544,477 | 12/1970 | Winkler | 340/174 |
| 3,623,014 | 11/1971 | Doelz et al. | 340/172.5 |
| 3,636,331 | 1/1972 | Amrehn | 235/151.12 |
| 3,725,861 | 4/1973 | Hancock | 340/146.1 |
| 3,803,568 | 4/1974 | Higashide | 340/213 R |
| 4,012,717 | 3/1977 | Censier et al. | 340/172.5 |
| 4,076,961 | 2/1978 | Holsinger et al. | 179/2 DP |
| 4,099,241 | 7/1978 | Ossfeldt | 364/200 |
| 4,118,772 | 10/1978 | Takada | 364/119 |
| 4,358,823 | 11/1982 | McDonald et al. | 364/200 |
| 4,359,718 | 11/1982 | Payen | 340/825.03 |
| 4,455,645 | 6/1984 | Mijioka et al. | 370/16 |
| 4,477,895 | 10/1984 | Casper et al. | 370/16 |
| 4,589,090 | 5/1986 | Downing et al. | 364/900 |
| 4,590,554 | 5/1986 | Glazer et al. | 364/200 |
| 4,610,013 | 9/1986 | Long et al. | 371/9 |
| 4,623,883 | 11/1986 | Konen | 340/825.01 |
| 4,639,852 | 1/1987 | Motomiya | 364/138 |
| 4,654,846 | 3/1987 | Goodwin et al. | 371/8 |
| 4,680,581 | 7/1987 | Kozlik et al. | 340/825.06 |

FOREIGN PATENT DOCUMENTS 2032149 4/1980 United Kingdom ............... 364/200

OTHER PUBLICATIONS

Cheng et al. "IBM Database 2 performance: Design, implementation, and tuning," IBM Systems Journal, vol. 23, No. 2 (1984), pp. 189-211.

Crus, R. A. "Data recovery in IBM Database 2," IBM Systems Journal, vol. 23, No. 2 (1984), pp. 178-188.

Primary Examiner—David Y. Eng
Assistant Examiner—Robert B. Harrell
Attorney, Agent, or Firm—Elmer Wargo

[57] ABSTRACT

A system and method for providing an automatic back-up primary terminal for a cluster of secondary terminals. The primary terminal and the back-up primary terminal are coupled over a communications network to the secondary terminals so that data from the secondary terminals is received simultaneously at both the primary and back-up primary terminals. Either the primary or the back-up primary terminal can function as the active provider of services to the secondary terminals. When either one of the primary terminals becomes inoperative, control is automatically switched to the other one which becomes the active provider of the services. The primary terminal which is the active provider of services keeps a log file (on a disc file) of special data which is to be "backed up" or transferred to the other primary terminal when that other primary terminal becomes operative again. The special data, in the embodiment described, related to price look-up and inventory totals associated with retail terminals.

9 Claims, 4 Drawing Sheets

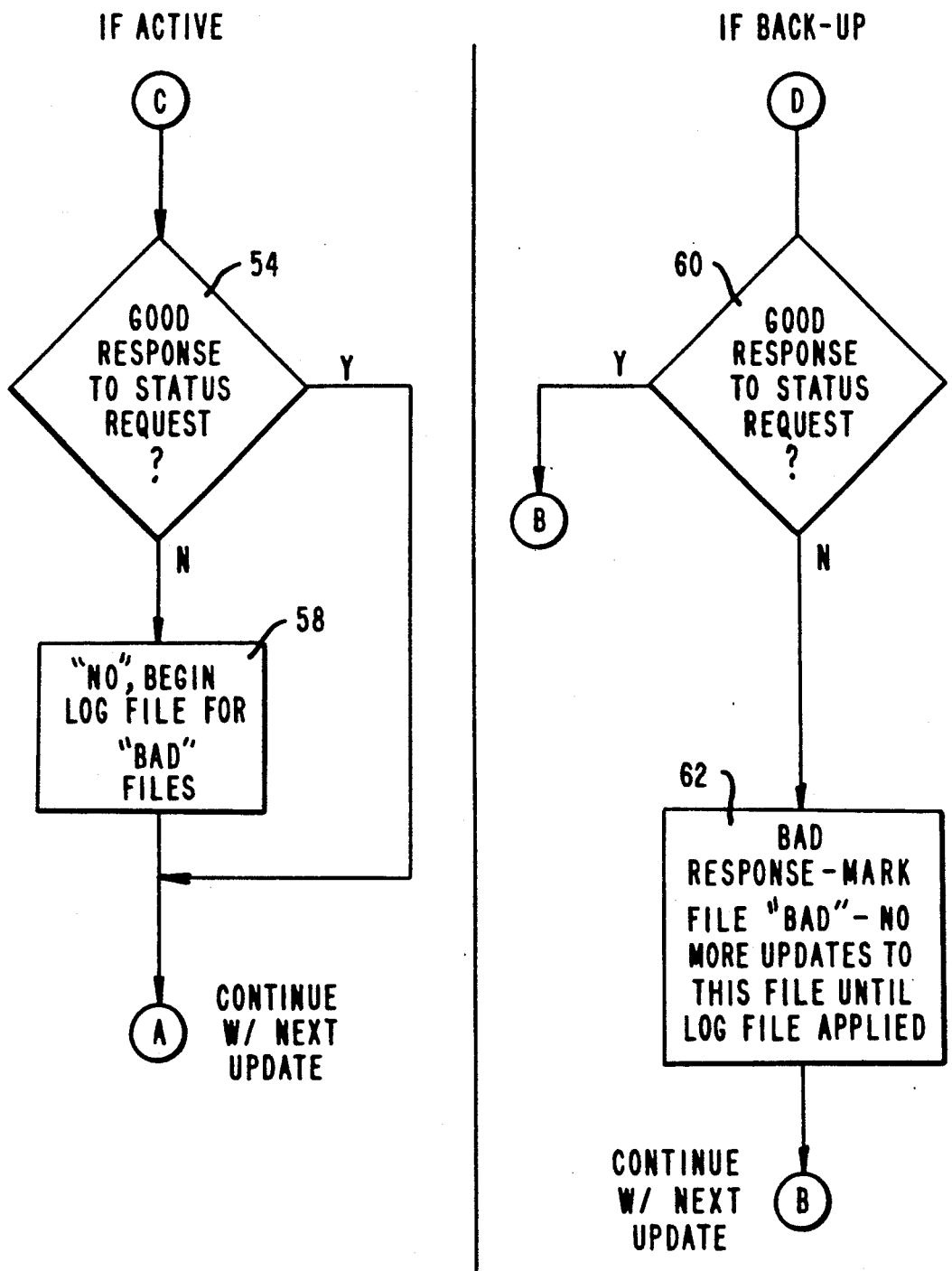

SYSTEM AND METHOD OF PROVIDING AN AUTOMATIC BACK-UP PRIMARY TERMINAL FOR A CLUSTER OF SECONDARY TERMINALS

This is a continuation of co-pending application Ser. No. 002,544, filed on Jan. 12, 1987, now abandoned.

BACKGROUND OF THE INVENTION

This invention relates to a system and method of providing an automatic back-up primary terminal for a cluster of secondary terminals.

In retail merchandising, increasing use is being made of universal pricing codes (UPC) which facilitate the transactions effected at checkout counters of retail establishments which use the UPC codes. The UPC codes are printed on the containers, for example, of the articles to be sold. A customer presents the article to be purchased at a checkout counter, and an operator at the checkout counter moves the UPC code on the article in operative relationship with a scanner at the counter. The scanner is coupled to a secondary or retail terminal (like a cash register) at the counter, and the retail terminal is coupled to a primary terminal which services a plurality of retail terminals in the retail establishment. The UPC code which is scanned at the checkout counter contains an article identification number which is used by the primary terminal to obtain the associated article description and the current price for that article. The description and price data are then sent to the retail terminal requesting that data where it is used for displaying the price to a customer, for printing at least portions of the description on a sales tape, and for tallying the customer's bill, for example. In general, the price and description associated with UPC codes are stored on a data disc at the primary terminal to facilitate effecting price changes and to obtain the price look-up (PLU) function.

One of the problems associated with the system described in the previous paragraph is that if the primary terminal is "down" or inoperative, the secondary terminals cannot obtain data servicing functions like the PLU function, for example, from the primary terminal.

SUMMARY OF THE INVENTION

An object of this invention is to provide a system and method of providing an automatic back-up primary terminal for a cluster of secondary terminals so as to obtain continuous data servicing for the secondary terminals.

In one aspect, this invention relates to a method of providing continuous data servicing functions for a plurality of secondary terminals including the steps of: (a) providing a primary terminal and back-up terminal; (b) coupling said secondary terminals to said primary and back-up terminal over a network which enables a message from any one of said secondary terminals to be received simultaneously at said primary and back-up terminals; (c) utilizing a first time out to determine whether said primary terminal or said back-up terminal is to be the primary provider of said servicing functions; (d) sending out polling signals over said network by whichever one of said primary terminal or said back-up terminal is said primary provider to enable said secondary terminals to receive said data servicing; (e) utilizing a lack of polling signals from the current said primary provider within a second time out for automatically switching to the other one of said primary terminal or said back-up terminal to enable said other one to become the next primary provider of said servicing functions.

In another aspect, this invention includes: first and second primary terminals having first and second memory means, respectively, for storing and retrieving data; a plurality of secondary terminals; a network coupling said secondary terminals to said first and second primary terminals to enable a message sent from a said secondary terminal to be simultaneously received at said first and second primary terminals; said first and second primary terminals each having a time-out means for generating a first time-out and a second time-out; said first time-out being used by said first and second primary terminals to determine which of said first and second primary terminals is to be the active primary provider of servicing functions to said plurality of secondary terminals and which of said first and second primary terminals is to be the back-up provider of said servicing functions; each of said first and second primary terminals also having polling means for sending polling signals on said network with regard to providing said servicing functions to said plurality of secondary terminals when either one of said first and second primary terminals is said active primary provider, whereby a lack of polling signals by said active primary provider within said second time-out is used by said back-up provider to indicate that said active primary terminal is inoperative and to enable said back-up provider to thereby become the next said active primary terminal; and said first and second primary terminals having means for keeping a log file for special data which is to be stored in both said first and second memory means whereby said next active primary terminal keeps a log of said special data for later transference to said first memory means when said first primary terminal becomes operative again to thereby enable said special data to be stored in both said first and second memory means.

Another feature of this invention is that the secondary terminals remain "on line" without knowing that the primary terminal is "down" and that they are being serviced by an alternate or back-up primary terminal.

These features and others will become more readily understood in connection with the following description, claims, and drawing.

BRIEF DESCRIPTION OF THE DRAWING

FIG. 4 is a flow chart showing certain operations in the system.

DESCRIPTION OF THE PREFERRED EMBODIMENTS

Figure 1:
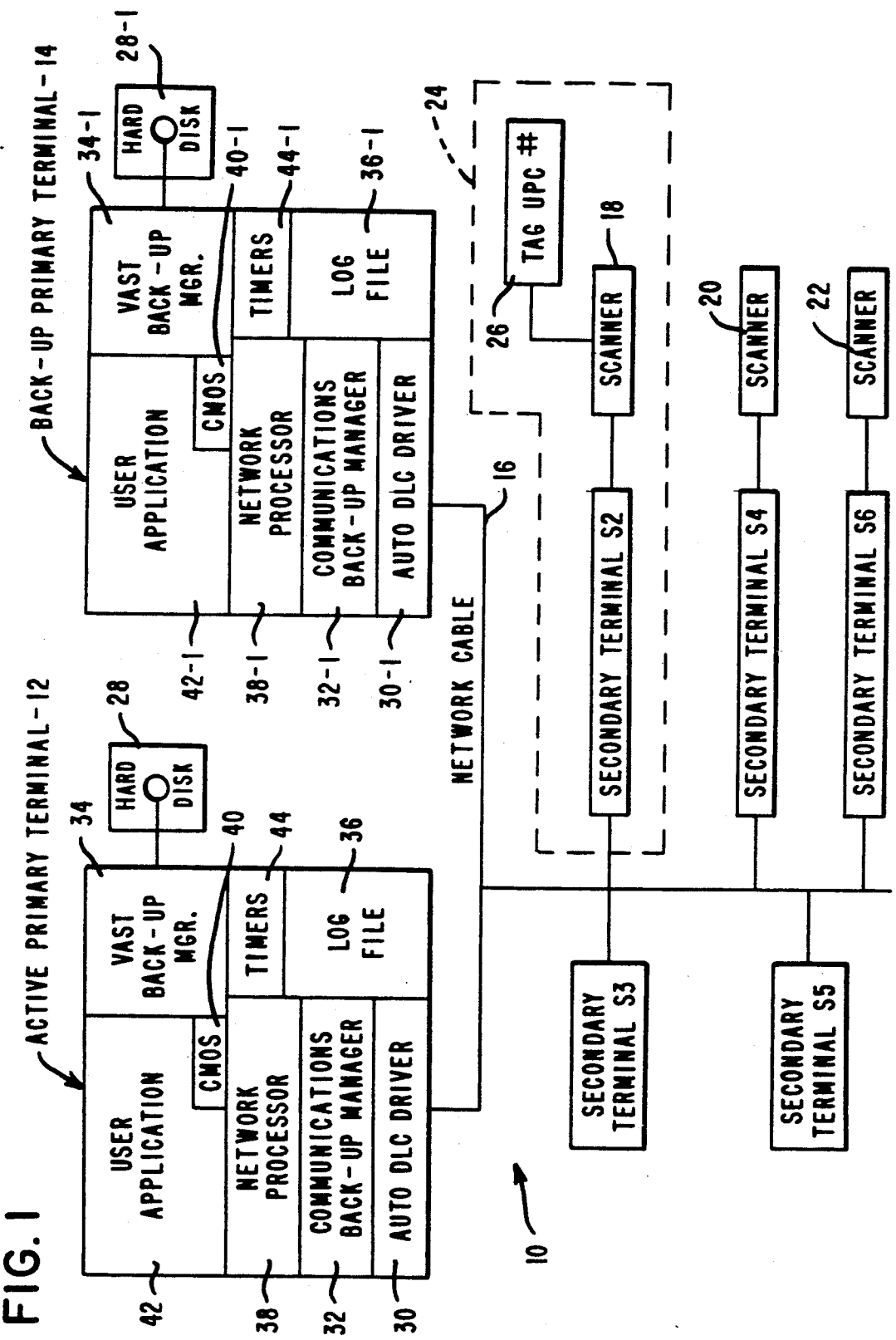
FIG. 1 is a general schematic diagram, in block form, of a system which may be used for practicing the method of this invention.

FIG. 1 is a schematic diagram, in block form, of a system 10 in which the method of this invention may be used. The system 10 chosen to portray this invention, for example, relates to a retail establishment of the type discussed in the Background of the Invention.

The system 10 (FIG. 1) includes a plurality of secondary terminals, like S2, S3, S4, S5 and S6 which are coupled to a first or "active" primary terminal 12 and a second or "back-up" primary terminal 14 over a network cable 16. The primary terminals 12 and 14 provide data servicing for the secondary terminals. In the embodiment described, at least some of the secondary terminals, like S2, S4 and S6 may have scanners, like 18, 20 and 22, respectively, associated therewith.

A secondary terminal S2 and its associated scanner 18 (FIG. 1) comprise what is referred to as a checkout counter which is shown enclosed in the dashed rectangle 24. When a customer presents an article to be purchased at the checkout counter 24, a clerk or operator moves the tag 26 or UPC code on the article in operative relationship with the scanner 18 to read the UPC code. The output of the scanner 18 is coupled to the secondary terminal S2, which is a retail terminal (like a "cash register", for example). The secondary terminal S2 is coupled to the active primary terminal 12, for example, over the network cable 16. At this stage in the description, the primary terminal 12 provides a price look-up (PLU) function for the secondary terminal S2 via the associated hard disc 28. The description and price data associated with the UPC code which was scanned at scanner 18 is accessed from the hard disc 28 and is routed back to the secondary terminal S2 which processes the data, conventionally.

If the primary terminal, like 12, becomes inoperative in prior art systems which have only one primary terminal, then the secondary terminals would not be able to obtain the PLU function. In the present system 10, an alternate or back-up terminal 14 is used in addition to the active primary terminal 12 so as to provide continuous data servicing to the secondary terminals S2-S6.

Before describing in detail the method of operating the system 10 shown in FIG. 1, it is useful to describe, generally, the components used therein. In this regard, the back-up primary terminal 14 is essentially identical to the primary terminal 12. At any one time, either terminal 12 or terminal 14 will be the active primary terminal; however, the system 10 is set up, generally, to have one of the two primary terminals 12 and 14 serve as the active or primary provider of the services provided to the secondary terminals. Assume that primary terminal 12 is set up to become the active primary terminal first. In this situation, the secondary terminals S2-S6 receive the PLU data, in the example described, from the primary terminal 12. Assume, also, that the primary terminal 12 becomes "inoperative". Because the back-up primary terminal 14 is also coupled to the network cable 16, it senses that primary terminal 12 is inoperative (via a technique to be later described herein), and it, the primary terminal 14, automatically becomes the "active" or primary provider of the services mentioned to the secondary terminals S2-S6. As far as the secondary terminals are concerned, they are not aware that they are being serviced by primary terminal 14 instead of primary terminal 12. At another "start-up" time, it is conceivable that primary terminal 14 may start out as being the "active" terminal while primary terminal 12 provides the back-up function. As used herein, that one of the primary terminals 12 or 14 which is "active" at the time will be considered as the primary provider of the services mentioned. Naturally, the types of services offered by the primary terminals 12 and 14 may differ for different applications; however, the principles of operation remain essentially the same.

Continuing with a general description of the components shown in FIG. 1, it has been alluded to that primary terminals 12 and 14 are substantially identical; therefore, a general description of only primary terminal 12 will be given.

The primary terminal 12 (FIG. 1) includes an automatic DLC (direct link control) driver 30 which includes both hardware and software for coupling the primary terminal 12 to the network cable 16 which is a DLC network in the embodiment described. The DLC network is a conventional direct link control network which is used by the NCR Corporation of Dayton, Ohio. The network cable 16 is a two wire system which is used, essentially, for "in-house" operations. The software associated with the DLC driver 30 is stored in the RAM (not shown) of the primary terminal 12, and the software is retained therein by a battery back-up system which automatically refreshes the data to keep it from being lost when the primary terminal is shut off. The DLC driver 30 also includes a table which contains a list for polling the various terminals included in the system 10.

The communications back-up manager 32 is software (stored in RAM) which handles the overall communications for the terminal 12 and the system 10. If any failure occurs either at the primary terminal 12 or its associated hard disc 28, for example, the communications back-up manager 32 will know, and it will notify the DLC driver 30 to take the appropriate action. For example, if the hard disc 28 fails, the communications back-up manager 32 informs the DLC driver 30 that data cannot be written onto the hard disc, and consequently, the primary terminal 12 will cease to function as the active terminal or provider of the services mentioned, and the back-up primary terminal 14 will take over as the active primary terminal.

The hard disc 28 shown in FIG. 1 is schematically shown and includes a conventional hard disc controller board and a hard disc driver (not shown) which are interfaced with the VAST back-up manager 34. The term "VAST" is an acronym for variable access storage technique. The VAST back-up manager 34 is software which is stored in the RAM of the terminal 34, and its function is to write data on the hard disk 28. Certain data within the system 10 is required to be backed up on the hard discs of both the active primary terminal, like 12, and the back-up primary terminal, like 14. If, for example, the hard disc 28 of active primary terminal 12 becomes inoperative, the VAST back-up manager 34 will set a flag to indicate that the data required to be backed up cannot be written on the hard disc 28. The VAST back-up manager 34 then informs the communications back-up manager 32 of the problem with the hard disc 28, to thereby initiate action making the back-up primary terminal 14 the active primary terminal. As an aside, that data which was required to be backed up would also have been received at the back-up primary terminal 14 at the same time that it was received at the primary terminal 12 when the primary terminal 12 was acting as the active primary terminal. This data is written onto the hard disc 28-1 associated with the primary terminal 14. Thereafter, the VAST back-up manager 34-1 will start to place this data on the log file 36-1 which is part of the hard disc 28-1 associated with the now active primary terminal 14. If additional data required to be backed up is received while the primary terminal 14 is active and the hard disc 28 of the now back-up primary terminal 12 is inoperative in the example being discussed, the VAST back-up manager 34-1 of the now active primary terminal 14 will continue to write the data to the log file 36-1 of the primary terminal 14. After a while, when the hard disc 28 of the now back-up primary terminal 12 is repaired, the first activity which the VAST back-up manager 34-1 will do is send the data which was temporarily placed on the log file 36-1 to the VAST back-up manager 34 which will write the data onto the hard disc 28. While the hard disc 28 of the primary terminal 12 may have been inoperative for a half-hour in the example being discussed, it usually takes only a few seconds for the data on the log file 36-1 to be transferred to the hard disc 28. After all the data is transferred to the hard disc 28, the VAST back-up manager 34 of the now-back-up primary terminal 12 removes the flag which was earlier set initiating the storing of data required to be backed up on the log file 36-1. Thereafter, the primary terminal 12 begins to function as the back-up primary terminal because its hard disc 28 is now fully operative in the example being described.

The general function of the network processor 38 (FIG. 1) is to handle the routing of messages between the DLC driver 30 and the hard disc 28. The network processor 38 is software which is written in the RAM of the primary terminal 12. The network processor 38 keeps a record of what data is received from which terminal. For example, if a data message from secondary terminal S2 is to be written on the hard disc 28 associated with the primary terminal 12, the network processor 38 would keep track of the data message as coming from secondary terminal S2. After the data message is written on the hard disc 28, the network processor 38 identifies the secondary terminal S2 as the terminal which should be notified that the data message has been written on the hard disc 28. During the time that the data message (from terminal S2) is being written on the hard disc 28 in the example described, the primary terminal 12 may poll the secondary terminals S3, S4 etc. for any messages to be sent to the primary terminal 12. During this polling, the network processor 38 tags the messages received as coming from the corresponding secondary terminals.

The CMOS memory (block 40) (FIG. 1) represents a CMOS type RAM which is used in the system 10 for storing critical data such as cumulative totals. The CMOS memory 40 has its own battery back-up system which can maintain the critical data for many weeks.

The user application 42 (FIG. 1) represents the customer's application software for the system 10. The primary terminal 12 also has a conventional processor, display, keyboard, etc. (not shown) to enable it to function as an intelligent terminal. The timers 44 represent hardware or software timers which are used in the system 10 as will be described hereinafter.

As alluded to earlier herein, the back-up primary terminal 14 is identical to the primary terminal 12, except as will be described hereinafter. Accordingly, like elements in back-up primary terminal 14 are given the same basic numbers as the corresponding elements in the primary terminal 12 except that the elements in primary terminal 14 are given a "dash one" (−1) suffix. For example, the automatic DLC driver of back-up primary terminal 14 is designated as 30-1.

Having described, generally, how the system 10 works and what components are included therein, it seems appropriate to discuss, in more detail, how the automatic back-up feature and data flow are effected.

Figure 2:
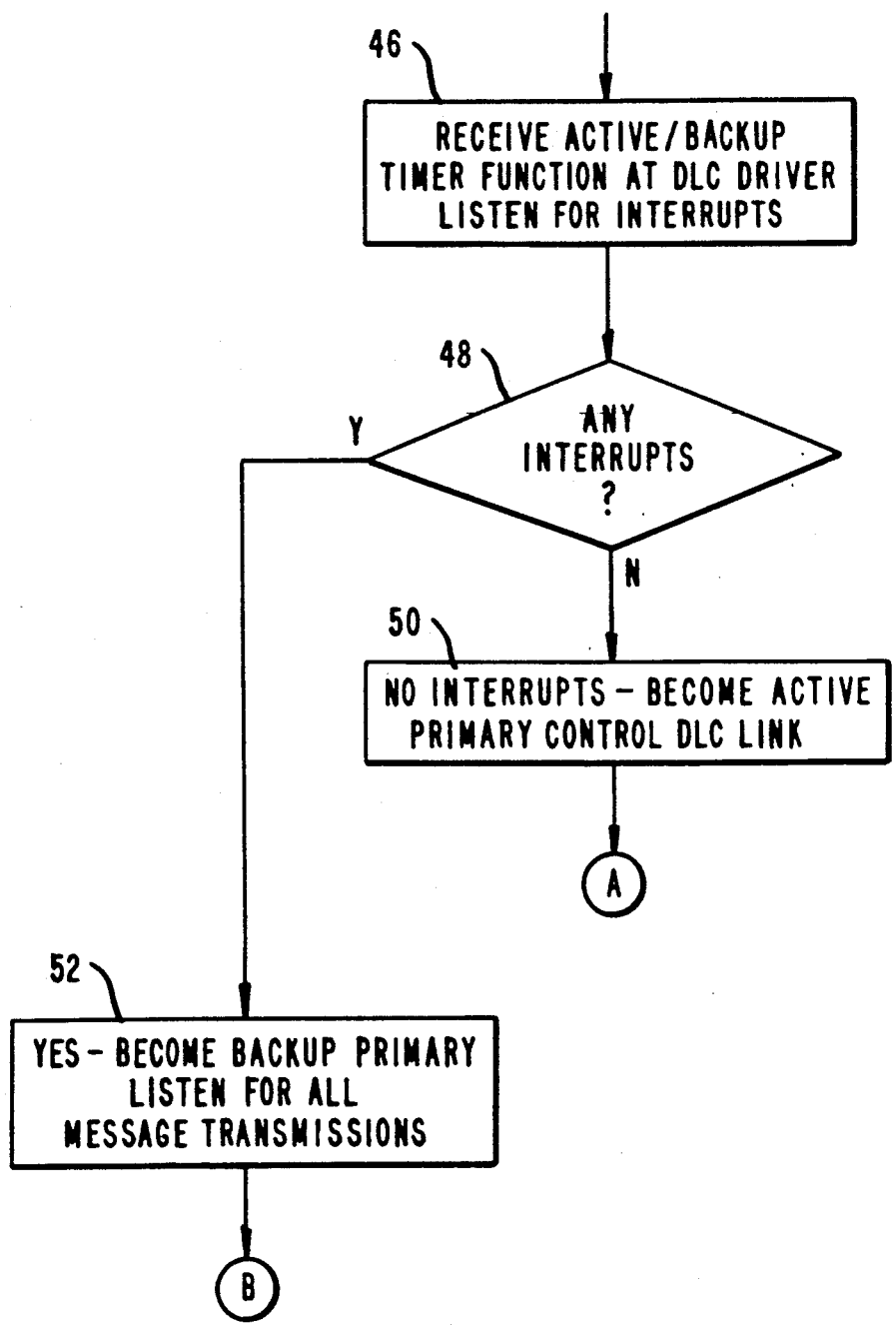
FIG. 2 is a flow chart showing how the system determines which of the primary terminals shown in FIG. 1 is to be the active one and which is to be the back-up one.

In this regard, FIG. 2 is a flow chart showing the steps for deciding which of the primary terminals 12 and 14 is to be the active primary terminal and which is to be the back-up primary terminal for the system 10. When initially set up, one of the primary terminals 12 and 14 would have a shorter time out incorporated into the associated timers 44 and 44-1. Assume that primary terminal 12 has the shorter time out. When the system 10 is first started up, an operator would turn on the primary terminal 12 first, and thereafter, the primary terminal 14 would be turned on. As soon as primary terminal 12 has "powered up", its timer function or time out occurs first, and as soon as the time out expires, the DLC driver 30 starts to listen (at its receiver portion) for polling signals on the network cable 16 as indicated at step 46 in FIG. 2. If no interrupts or polling signals are obtained within 275 milliseconds in the embodiment described, as shown by step 48, it means that the other primary terminal (terminal 14 in this instance) is not active. Normal polling in the system 10 occurs every 125-150 milliseconds. Because there are no interrupts or polling signals in the example described, primary terminal 12 becomes the active primary terminal for the system 10 as indicated by step 50. If at step 48, interrupts or polling signals were detected by the primary terminal 12, it would mean that the primary terminal 14 had become the active primary terminal, and accordingly, primary terminal 12 would become the back-up primary terminal as indicated at step 52. Note that it is possible for the primary terminal 14 to become the active primary terminal for the system 10 even through the timer 44 in the primary terminal 12 is of shorter duration. This could occur if primary terminal 14 were turned on before the primary terminal 12 were turned on. Each of the primary terminals 12 and 14 has an initialization routine which enables it to take over as the active primary terminal when it is so determined by the technique described. Once a primary terminal, like 12, is designated as the active primary terminal, control is passed to its associated DLC driver, like 30, to start polling the secondary terminals S2-S6. During the time that primary terminal 14 is the back-up primary terminal, it may be considered as a secondary terminal from the standpoint of having it perform functions similar to those performed by secondary terminals S2-S6, for example. This is a feature of the present invention in that the back up primary terminal (like 14) performs additional functions instead of sitting idly in a back up mode. For example, the primary terminal (like 14) may have a scanner (like 18) attached to it to perform functions similar to a secondary terminal (like S2).

Primary terminal 12 (FIG. 1) would continue to be the active primary terminal 12 in system 10, for the example being described, until there was a failure at the primary terminal 12. This failure is evidenced by a lack of polling signals every 150 milliseconds in the embodiment described. During the time that primary terminal 12 is active, the DLC driver 30-1, associated with the back-up primary terminal 14, sets a timer 44-1 for 150 milliseconds and listens for a polling signal on the network cable 16. If a polling signal is received prior to the end of the 150 millisecond period, the DLC driver 30-1 resets the timer 44-1 for another 150 millisecond period. If a polling signal from the active primary terminal 12 is not received within the stated period, a time-out from the counter 44-1 occurs. This time-out is used by the back-up primary terminal 14 to indicate that the primary terminal 12 is no longer functioning properly and that the back-up primary terminal 14 should now assume the role of the active primary terminal for the system 10. The primary terminal 14 assumes control as the active primary via its DLC driver 30-1 by starting to send polling signals on the network cable 16.

Assume that after start up, the primary terminal 12 is the active terminal or provider of services to the system 10, with primary terminal 14 being the back-up primary. The active primary terminal 12 then polls all the terminals in the system to determine whether or not they are active or running. In this regard, the back-up primary 14 is considered a secondary terminal in that it can perform functions similar to those performed by the secondary terminals S2-S6 in addition to performing the usual primary terminal functions. This makes active use of the back-up terminal 14 instead of having it remain simply idle in a back-up function for the primary terminal 12 as previously stated.

The DLC driver 30 (FIG. 1) of the active primary terminal 12 has a polling list of the terminals included in the system 10, with the back-up primary terminal 14 being polled first. Thereafter, the secondary terminals S2-S6, in the embodiment described, are polled. The first step in the DLC protocol used is to send a set normal response mode (SNRM) message from the active primary terminal 12 to the back-up terminal 14. If the back-up primary terminal 14 is operative, it sends an unnumbered acknowledgment (UA) back to the primary terminal 12. The active primary terminal 12 then sends an acknowledge (ACK) response to the back-up primary terminal 14. The polling by active primary terminal 12 then proceeds, similarly, to the S2-S6 secondary terminals. If one of the secondary terminals, like S4, for example, does not respond, a "no" response will occur. In this situation, the active primary terminal 12 will keep a log file for "bad" or inoperative terminals.

Once the active primary terminal 12 determines that the status of all the other terminals in the system 10 is active, for example, it begins to poll them for any messages which they might have. If a secondary terminal like S4 wishes to send data to the active primary terminal 12, it does so when it is polled. After the data is sent to the active primary terminal 12, the terminal 12 will then send an acknowledgment (ACK) to the secondary terminal S4 that the data was received. Thereafter, secondary terminal S4 can drop the data.

As stated earlier herein, when data is to be backed up, the data is stored on the hard disc 28 of the active primary terminal 12, and it is also stored on the hard disc 28-1 of the back-up primary terminal 14. It should be recalled that the back-up primary terminal 14 also receives the request for data to be backed up via the network cable 16.

Figure 3:
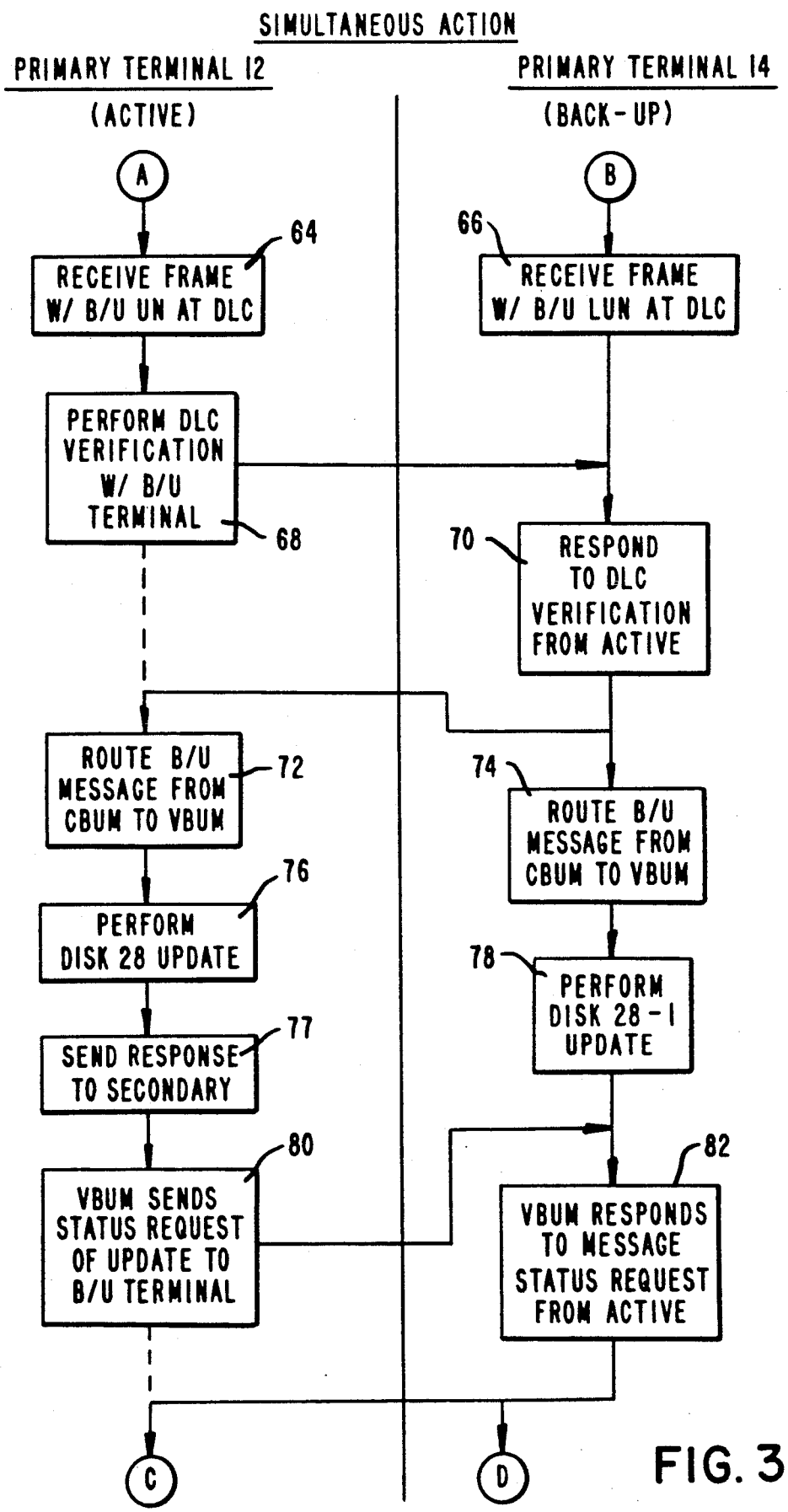
FIG. 3 is a flow chart showing the sequence of operations in certain back-up functions.

Assume a situation in which the secondary terminal S2 has data which is to be backed up after being polled by the active primary terminal 12. The secondary terminal S2 sends a formatted message to the active primary terminal 12 with a request for back-up (B/U) and a logical unit number (LUN) for the active primary terminal 12 as shown at step 64 in FIG. 3. The LUN represents the address of the hard disc 28 in the example being described; however, the LUN could represent a printer (not shown) associated with the active primary terminal 12. All the messages coming from the secondary terminals, like S2, are directed at the active primary terminal, which in this example, is primary terminal 12, although the back-up primary terminal 14 also receives the data at this same time as shown by steps 64 and 66 in FIG. 3.

As the data is sent to the active primary terminal 12, the same data is stored in a buffer within the back-up primary terminal 14. After the data is received at the active primary terminal 12, this terminal 12 performs a DLC verification with the back-up (B/U) primary terminal 14 as shown at step 68 in FIG. 3. The B/U primary terminal 14 then responds (at step 70) by sending an acknowledgment UI and a count. The count is used in the DLC protocol associated with the system 10 which is used to keep account of messages which are sent; this message count goes from zero through seven and repeats at zero again. The active primary terminal 12 knows what message count is associated with each secondary terminal as part of the known DLC protocol. After the B/U primary terminal 14 responds at step 70, the active primary terminal 12 routes the message being discussed from the communications back-up manager (CBUM) 32 to the VAST back-up manager VBUM 34 as shown at step 72 and as discussed earlier herein. At the same time, the message to be backed up is routed from the CBUM 32-1 to the VBUM 34-1 of the B/U primary terminal 14, as shown at step 74. Thereafter, the message being discussed is written to the hard disc 28 associated with the active primary terminal 12, as shown at step 76. Correspondingly, the message is written to the hard disc 28-1 associated with the B/U primary terminal 14 as shown at step 78 in FIG. 3. The active primary terminal 12 then sends a response to the secondary terminal (step 77 in FIG. 3) indicating that the hard disc 28 has been updated. Thereafter, the VBUM 34 of the active primary terminal 12 requests an update (at step 80) of the B/U primary terminal 14 as to whether or not the message has actually been written on the hard disc 28-1. The VBUM 34-1 of the B/U primary terminal 14 then response by indicating that the message was backed up or written on the hard disc 28-1, as shown at step 82 in FIG. 3 or step 60 in FIG. 4. The active primary terminal 12 then proceeds to point "C" or step 54 in FIG. 4 to poll other terminals. If the VBUM 34-1 of the B/U primary terminal 14 indicated that the message was not written on the hard disc 28-1 as expected, the VBUM 34 would then keep a log in the log file 36 of this message, as shown as step 58 in FIG. 4. The B/U primary terminal 14 would not accept updates to its hard disc 28-1 (Step 62 in FIG. 4) until the B/U primary terminal 14 becomes operative and the data from the log file 36 from the primary terminal 12 was applied to the hard disc 28-1. When the problem at the hard disc 28-1 is corrected, the messages on the log file 36 would then be written to the hard disc 28-1, as previously discussed herein. Notice for messages requiring to be backed up, there is a verification at the DLC level (as at step 68 in FIG. 3) and at a second level as represented by the VBUM 34 request at step 80 in FIG. 3.

It is a feature of this invention that nothing is written on to the hard disc (like 28-1) of the B/U primary terminal (like 14) unless the active primary terminal (like 12) writes the same data into the hard disc, (like 28). This enables the hard discs 28 and 28-1 of the primary terminals 12 and 14, respectively, to have the same data. This is especially important when special data like inventory totals or data is being written.

Another important feature is that if the active primary terminal 12 fails in the middle of a transaction, the B/U primary terminal 14 will take over without the secondary terminal, like S2 for example, knowing that there was a change in the primary terminal. If the data were to be backed up, the B/U primary terminal 14, in the example described, would know that the primary terminal 12 was no longer operative, so, the B/U primary terminal 14, through its VBUM 34-1, would write the data on the log file 36-1. When the "downed" primary terminal 12 eventually become operative, the now active primary terminal 14 would cause the data on the log file 36-1 to be backed up on the hard disc 28 of the now B/U primary terminal 12 as previously discussed.

What is claimed is:

1. A method of providing continuous data servicing functions for a plurality of secondary terminals comprising the steps of:
   (a) providing a primary terminal and a back-up terminal, said primary terminal or said back-up terminal, when active, being considered a primary provider of said data servicing functions;
   (b) coupling said plurality of secondary terminals to said primary terminal and said back-up terminal over a network which enables a message from any one of said plurality of secondary terminals to be received simultaneously at said primary terminal and said back-up terminal;
   (c) utilizing a first time-out period and a indefinite order of turning on said first and second primary terminals to determine whether said primary terminal or said back-up terminal is to be active as said primary provider of said data servicing functions;
   (d) sending out polling signals over said network by whichever one of said primary terminal or said back-up terminal is said primary provider to enable said plurality of secondary terminals to receive said data servicing;
   (e) utilizing a lack of polling signals from said primary provider within a second time-out period for automatically switching to another one of said primary terminal or said back-up terminal to enable said another one to become a next said primary provider of said data servicing functions; and
   (f) using said next primary provider from step (e) as the primary provider of said data servicing functions until a failure thereof.

2. The method as claimed in claim 1 in which said utilizing step (c) is effected by:
   (c1) listening for polling signals on said network by that one of said primary terminal or said back-up terminal whose said first time-out period has occurred; and
   (c2) assuming control as said primary provider if no said polling signals are received within said second time-out period by that one of said primary terminal or said back-up terminal whose said first time-out period has occurred.

3. The method as claimed in claim 2 in which said providing step (a) includes:
   (a1) providing said primary terminal with a shorter said first time-out period than said back-up terminal.

4. A method of providing continuous data servicing functions for a plurality of secondary terminals, with one of said data servicing functions being a backing up of totals to be stored; said method comprising the steps of:
   (a) providing a primary terminal and a back-up terminal, said primary terminal or said back-up terminal, when active, being considered a primary provider of said data servicing functions;
   (b) coupling said plurality of secondary terminals to said primary terminal and said back-up terminal over a network which enables a message from any one of said plurality of secondary terminals to be received simultaneously at said primary terminal and said back-up terminal so as to enable said totals to be stored at said primary terminal and said back-up terminal;
   (c) utilizing a first time-out period and a indefinite order of turning on said first and second primary terminals to determine whether said primary terminal or said back-up terminal is to be active as said primary provider of said data servicing functions;
   (d) sending out polling signals over said network by whichever one of said primary terminal or said back-up terminal is said primary provider to enable said plurality of secondary terminals to receive said data servicing; and
   (e) utilizing a lack of polling signals from said primary provider within a second time-out period for determining that said primary provider is inoperative and for automatically switching to another one of said primary terminal or said back-up terminal to enable said another one to become a next said primary provider of said data servicing functions;
   (f) storing said totals on a log file at a next primary provider of said data servicing functions; and
   (g) transferring said totals on said log file from step (f) to said primary provider of step (e) after said primary provider of step (e) again becomes operative to enable said special data to be stored at said primary terminal and said back-up terminal; and
   (h) using said next primary provider from step (f) as the primary provider of said data servicing functions until the failure thereof.

5. The method as claimed in claim 4 in which said utilizing step (c) is effected by:
   (c1) listening for polling signals on said network by that one of said primary terminal or said back-up terminal whose said first time-out period has occurred; and
   (c2) assuming control as said primary provider if no said polling signals are received within said second time-out period out by that one of said primary terminal or said back-up terminal whose said first time-out period has occurred.

6. The method as claimed in claim 5 in which said providing step (a) includes:
   (a) providing said primary terminal with a shorter said first time-out period than said back-up terminal.

7. A system comprising:
   first and second primary terminals;
   a plurality of secondary terminals;
   a network coupling said plurality of secondary terminals to said first and second primary terminals to enable a message sent from one of said secondary terminals of said plurality of secondary terminals to be simultaneously received at said first and second primary terminals;
   said first and second primary terminals each having a time-out means for generating a first time-out period and a second time-out period;
   said first time-out period and an indefinite order of turning on said first and second primary terminals being used by said first and second primary terminals to determine which of said first and second primary terminals is to be an active primary provider of servicing functions to said plurality of secondary terminals and which of said first and second primary terminals is to be a back-up provider of said servicing functions; and each of said first and second primary terminals also having polling means for sending out polling signals on said network with regard to providing said data servicing functions to said plurality of secondary terminals when either one of said first and second primary terminals is said active primary provider and also for enabling a lack of polling signals by said active primary provider within said second time-out period to be used by said back-up provider to indicate that said active primary provider is inoperative and to enable said back-up provider to thereby become a next said active primary provider of said data servicing functions until the failure thereof.

8. A system comprising:

first and second primary terminals having first and second memory means, respectively, for storing and retrieving data;

a plurality of secondary terminals;

a network coupling said plurality of secondary terminals to said first and second primary terminals to enable a message sent from one of said secondary terminals to be simultaneously received at said first and second primary terminals;

said first and second primary terminals each having a time-out means for generating a first time-out period and a second time-out period;

said first time-out period and an indefinite order of turning on said first and second primary terminals being used by said first and second primary terminals to determine which of said first and second primary terminals is to be an active primary provider of data servicing functions to said plurality of secondary terminals and which of said first and second primary terminals is to be a back-up provider of said data servicing functions; and each of said first and second primary terminals also having polling means for sending out polling signals on said network with regard to providing said data servicing functions to said plurality of secondary terminals when either one of said first and second primary terminals is said active primary provider and also for enabling a lack of polling signals by said active primary provider within said second time-out period to be used by said back-up provider to indicate that said active primary provider is inoperative and to enable said back-up provider to thereby become a next said active primary provider of said data servicing functions until the failure thereof; and said first and second primary terminals each having logging means including a log file for keeping totals which are to be stored in both said first and second memory means and also having means enabling a next active primary provider to keep a log of said totals in said log file for later transference to said first memory means or second memory means when a first primary terminal becomes operative again to thereby enable said totals to be stored in both said first and second memory means.

9. The system as claimed in claim 8 in which said first and second memory means comprise first and second hard disc files, respectively, with said log file in each of said first and second primary terminals being part of said first and second hard disc files, respectively.

* * * * *